United States Patent
Hays et al.

(10) Patent No.: US 8,491,253 B2
(45) Date of Patent: Jul. 23, 2013

(54) TWO-PHASE, AXIAL FLOW, TURBINE APPARATUS

(75) Inventors: Lance G. Hays, Anaheim, CA (US); Phillip R. Welch, Irvine, CA (US)

(73) Assignee: Energent Corporation, Santa Ana, CA (US)

( * ) Notice: Subject to any disclaimer, the term of this patent is extended or adjusted under 35 U.S.C. 154(b) by 865 days.

(21) Appl. No.: 12/290,627

(22) Filed: Nov. 3, 2008

(65) Prior Publication Data

US 2010/0111669 A1 May 6, 2010

(51) Int. Cl.
*F01B 25/00* (2006.01)

(52) U.S. Cl.
USPC .............................. 415/48; 415/80

(58) Field of Classification Search
USPC .............................. 415/48, 80, 167
See application file for complete search history.

(56) References Cited

U.S. PATENT DOCUMENTS

| | | | |
|---|---|---|---|
| 2,944,792 A | 7/1960 | Gros | |
| 4,177,948 A * | 12/1979 | Schaffitz et al. | 239/533.3 |
| 4,295,257 A | 10/1981 | Strohs | |
| 4,382,746 A * | 5/1983 | Retz | 415/202 |
| 5,102,295 A | 4/1992 | Pope | |
| 5,456,425 A | 10/1995 | Morris et al. | |
| 6,487,848 B2 | 12/2002 | Zysman et al. | |
| 6,709,239 B2 | 3/2004 | Chadraker | |
| 6,804,612 B2 | 10/2004 | Chow et al. | |
| 7,024,301 B1 * | 4/2006 | Kar et al. | 701/104 |
| 7,093,503 B1 | 8/2006 | Hays et al. | |
| 2003/0194950 A1 * | 10/2003 | Ulrich et al. | 451/38 |
| 2005/0008474 A1 * | 1/2005 | Stalder | 415/116 |
| 2006/0168959 A1 * | 8/2006 | Jinnai et al. | 60/602 |
| 2006/0248898 A1 * | 11/2006 | Buelow et al. | 60/776 |

* cited by examiner

*Primary Examiner* — Julio J Maldonado
*Assistant Examiner* — Robert Bachner
(74) *Attorney, Agent, or Firm* — William W. Haefliger (57) ABSTRACT

A turbine is operatively connected to load structure, to transmit rotary drive thereto, with two-phase flow nozzle receiving pressurized flow to rotate the turbine, the nozzle structure configured to expand flow consisting of two or more of the following phases:
i) gas
ii) liquid
iii) gas and liquid mixture
iv) supercritical gas and liquid mixture, and with efficient conversion of enthalpy.

34 Claims, 12 Drawing Sheets

TWO-PHASE, AXIAL FLOW, TURBINE APPARATUS

BACKGROUND OF THE INVENTION

This invention relates generally to fluid driven turbines and more generally to those having a variable phase fluid driving the turbine. The variable phase may be a mixture of a gas and liquid phase; or a supercritical phase; or a supercritical phase that transitions within the device to a mixture of gas and liquid or to a pure gaseous phase; or a liquid phase that transitions within the device to a mixture of gas and liquid; or a liquid phase that transitions within the device to a mixture of gas and liquid and then subsequently transitions also within the device to a pure gaseous phase. Apparatus that efficiently converts all these fluid combinations is necessary for turbines and heat engines that optimize the production of power from heat energy, and from pressure energy in industrial processes.

Turbines are widely used in industry to convert energy in liquid streams or gas streams to shaft power. Less common, but also used are turbines to convert energy in two-phase (gas and liquid) streams to shaft power. A further requirement can be the conversion of supercritical streams and/or streams that transition from a single phase to two-phase streams. Still further applications exist for the conversion of energy in two-phase streams that transition to a gaseous stream.

At present, the turbines for each type of stream are unique to that stream. That is, a turbine configured to be gas driven is not readily usable for liquid or two-phase flow. For example, attempts to use radial inflow gas turbines for two-phase flow have resulted in poor performance and damage because the directions of centrifugal body forces are such as to throw liquid backwards into the nozzle blades.

Applicants herein believe that no efficient turbine design exists for the case of a two-phase stream which transitions to a gaseous stream within the turbine, or for a supercritical stream which transitions to a two-phase stream within the turbine or for a supercritical stream which transitions to a two-phase stream that subsequently transitions to a gaseous stream within the turbine. These instances will be referred to herein as "Transition Flows".

Certain applications for turbines require the use of different types of fluid streams for differing conditions, as well as the use of Transition Flows. For example, a low temperature geothermal power system may require use of a gas stream or a two-phase flow stream, depending upon the temperature and working fluid used in the power producing cycle. To maximize power production, the geothermal power system may require a turbine to start in the supercritical flow regime and handle the transition to a two-phase stream within the turbine.

At present, to provide an efficient power conversion system, a new or specialized turbine must be designed, manufactured and qualified for each application. This is costly and time consuming and reduces flexibility, if the thermal characteristics of a given application change with time. There is need for an efficient turbine that can be driven by gas, or liquid or two-phase fluid flow. There is also a need for an efficient turbine that can be driven by Transition Flows.

SUMMARY OF THE INVENTION

It is a major object of the invention to provide a solution or solutions to the above described problems and needs.

An object of the present invention is to provide an improved turbine characterized by one or more of the following:

a) use for two-phase flow to generate power efficiently;
b) use for Transition Flow to generate power efficiently;
c) use for either gas, liquid, two-phase or Transition Flow, with minor adjustments to a component part, or parts, such adjustments typically concerning nozzle inserts and blade adjustments.

A further object is to provide a turbine that can operate efficiently with changes in input two-phase flow stream or Transition Flow stream parameters, such as inlet pressure or flow rate.

Yet another object is to provide a turbine that will separate liquid from the gas stream leaving the turbine to maximize the effectiveness of any downstream heat rejection or separation equipment.

An added object is provision of a turbine and electric generator assembly that can be used for either gas, liquid, two-phase flow or Transition Flow, and that requires no external seals, referred to herein as the Variable Phase Turbine Generator Assembly (VPTGA).

Another object is provision of a turbine, electric generator and pump assembly that can be used for either gas, liquid or two-phase flow with no external seals, referred to herein as the Variable Phase Turbine Generator Pump Assembly (VPTGPA).

Another object is provision of a compressor means connected to the shaft of the VPT to utilize the shaft power to add compression energy to a separate gas stream from a process, or to the separated gaseous stream from the exit of the VPT.

Another object of the invention is provision of a pump means connected to the shaft of the VPT to use the power created by the VPT to pump another stream.

An additional object in provision of variable phase turbine apparatus that comprises:

a) nozzle means operable to discharge a fluid medium of liquid, supercritical fluid or a mixture of liquid and gas with conversion of medium enthalpy to kinetic energy in a directed stream of a mixture of gas and liquid, supercritical fluid or pure gas, said directed stream characterized by the chemical composition of the fluid medium and the thermodynamic conditions of the enthalpy conversion process, said nozzle means directing the flow at blade means, for displacing said blade means, b) the blade means configured to maximize the conversion of the kinetic energy of said directed stream into torque acting upon rotor means carrying said blades, c) said rotor means to which said blades are attached transmitting the torque to a shaft to which the rotor and a load are attached, d) casing means configured to confine and direct the medium and which contains bearings and seals to enable the shaft to transmit the torque, and e) shroud means configured to prevent liquid which has transferred kinetic energy to the blades from contacting the casing and from being re-directed to contact the moving blades, causing losses in torque.

A further object is to provide for adjusting turbine nozzle flow through configuration as a function of input pressurized fluid phase composition, to maximize kinetic energy, minimize particle sizes, or optimize the combination of kinetic energy and particle size of nozzle discharge to turbine blades.

As will be seen, means may be provided at one end of the turbine and responsive to positioning of nozzle pintle means to vary the flow area of the nozzle means by axial translation of said pintle means, to maximize kinetic energy minimize particle sizes, or optimize the combination of kinetic energy and particle size leaving the nozzle means, for two or more flow phases.

DETAILED DES

Figure 1:
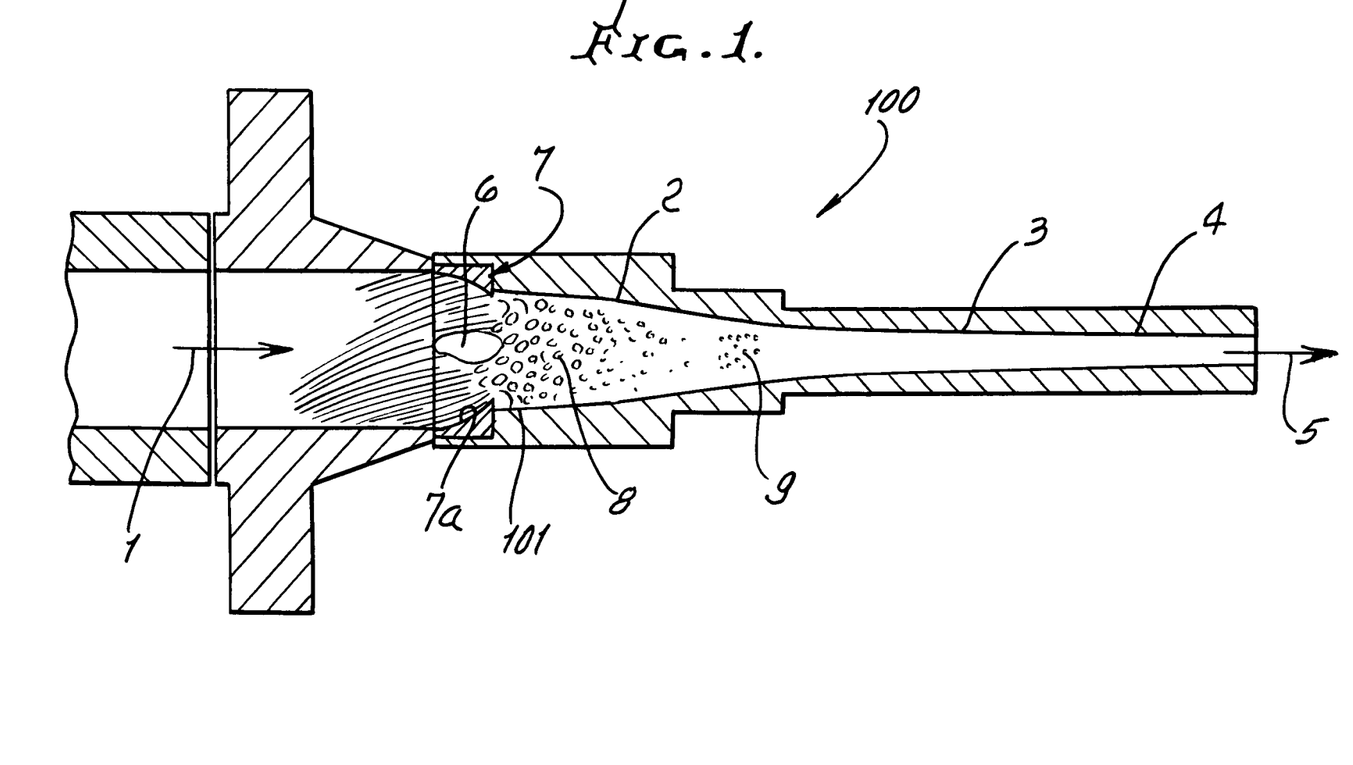
FIG. 1 is a section taken through a variable phase nozzle.
Figure 2:
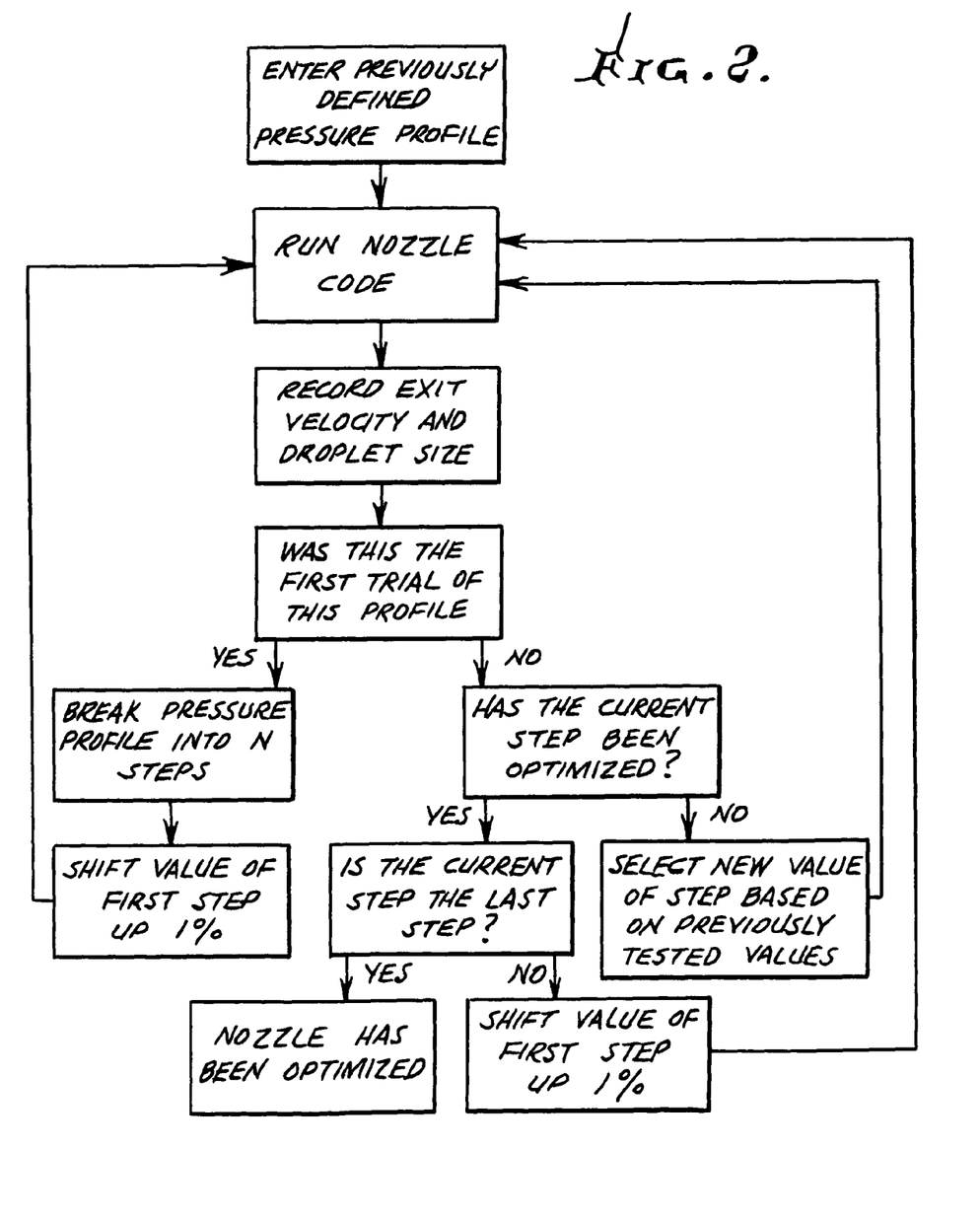
FIG. 2 is a block diagram as respects nozzle option.
Figure 3:
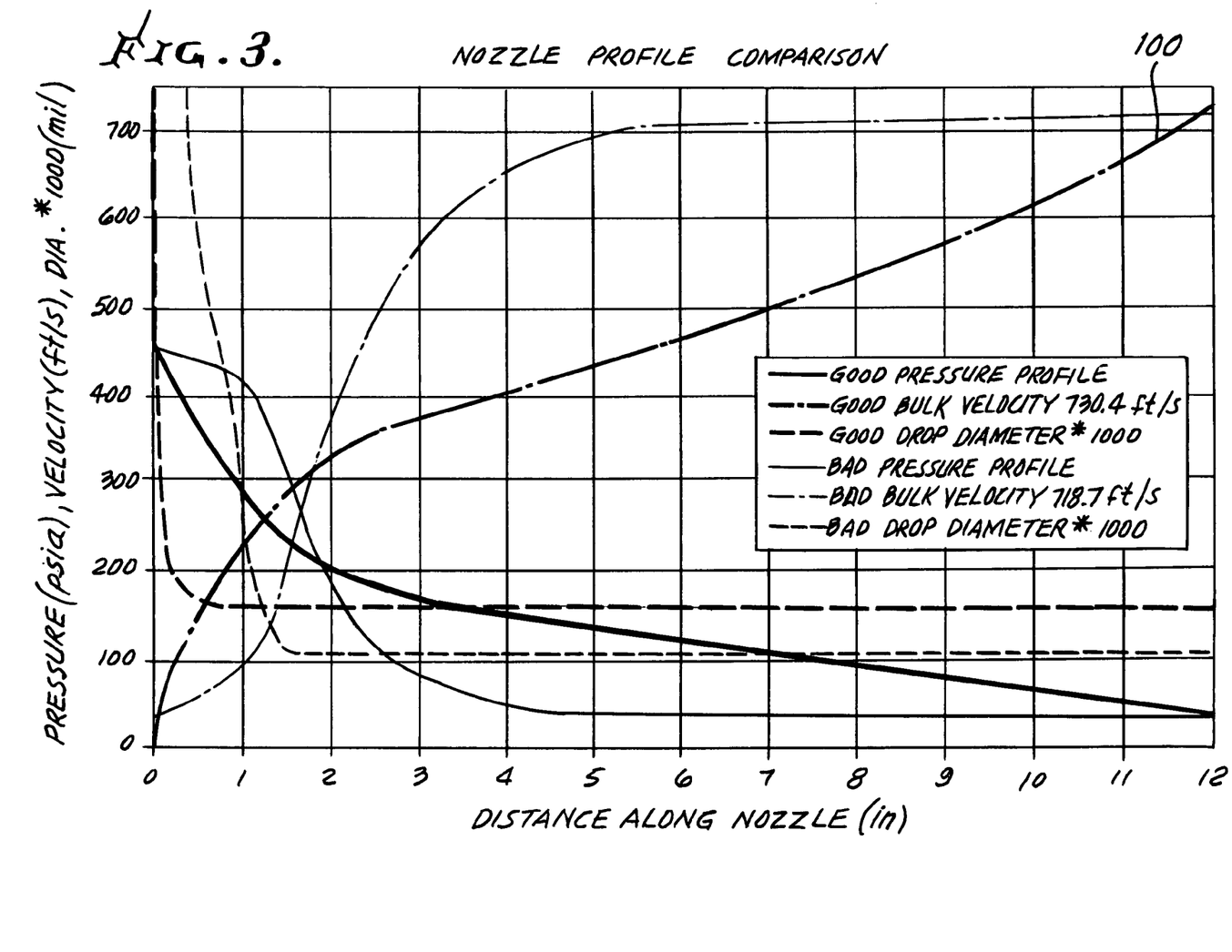
FIG. 3 is a comparison of two nozzle pressure profiles and the resulting bulk velocities and particle sizes.
Figure 4:
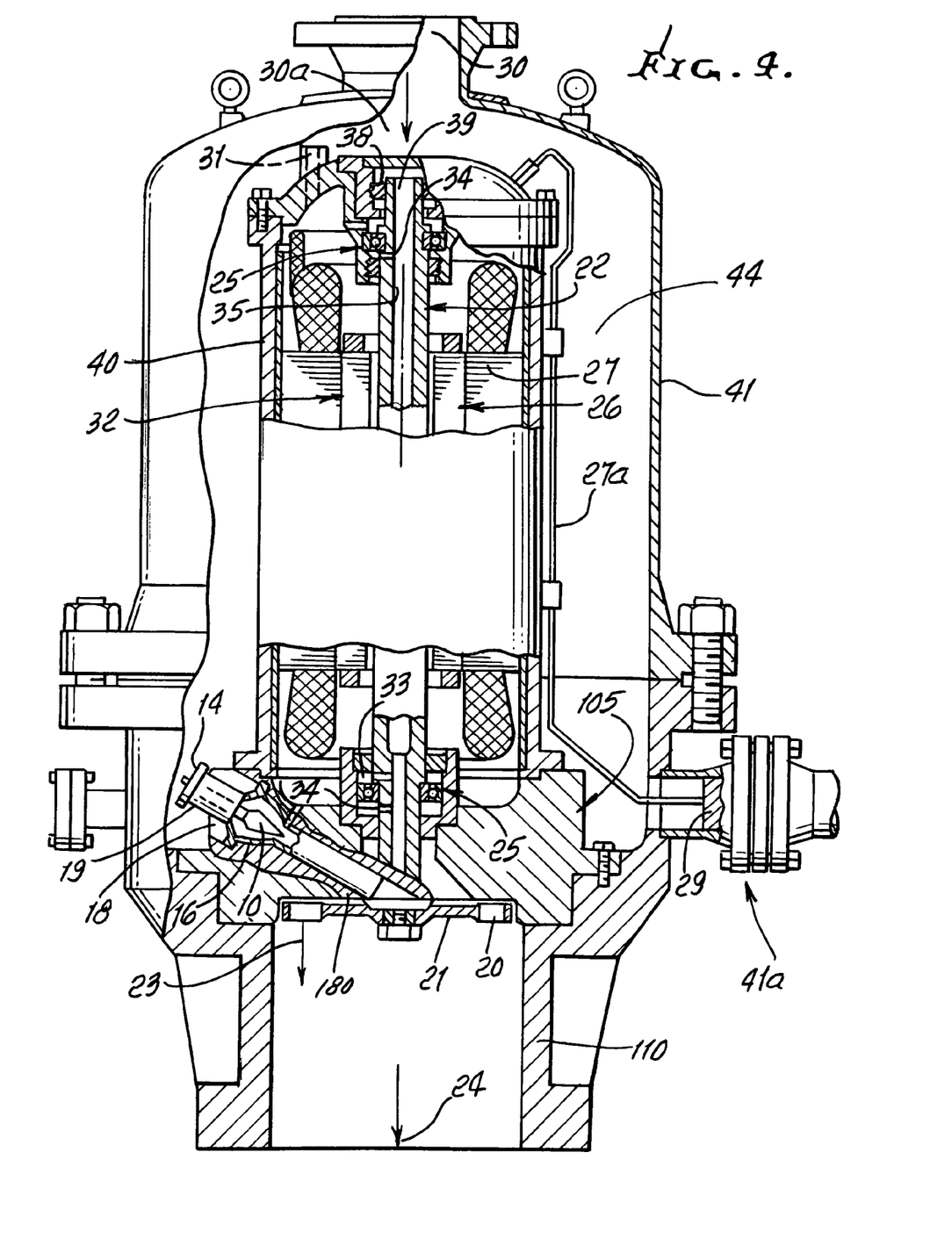
FIG. 4 is a section taken through preferred variable phase turbine apparatus incorporating a hermetically enclosed electrical generator and with variable nozzles.
Figure 4A:
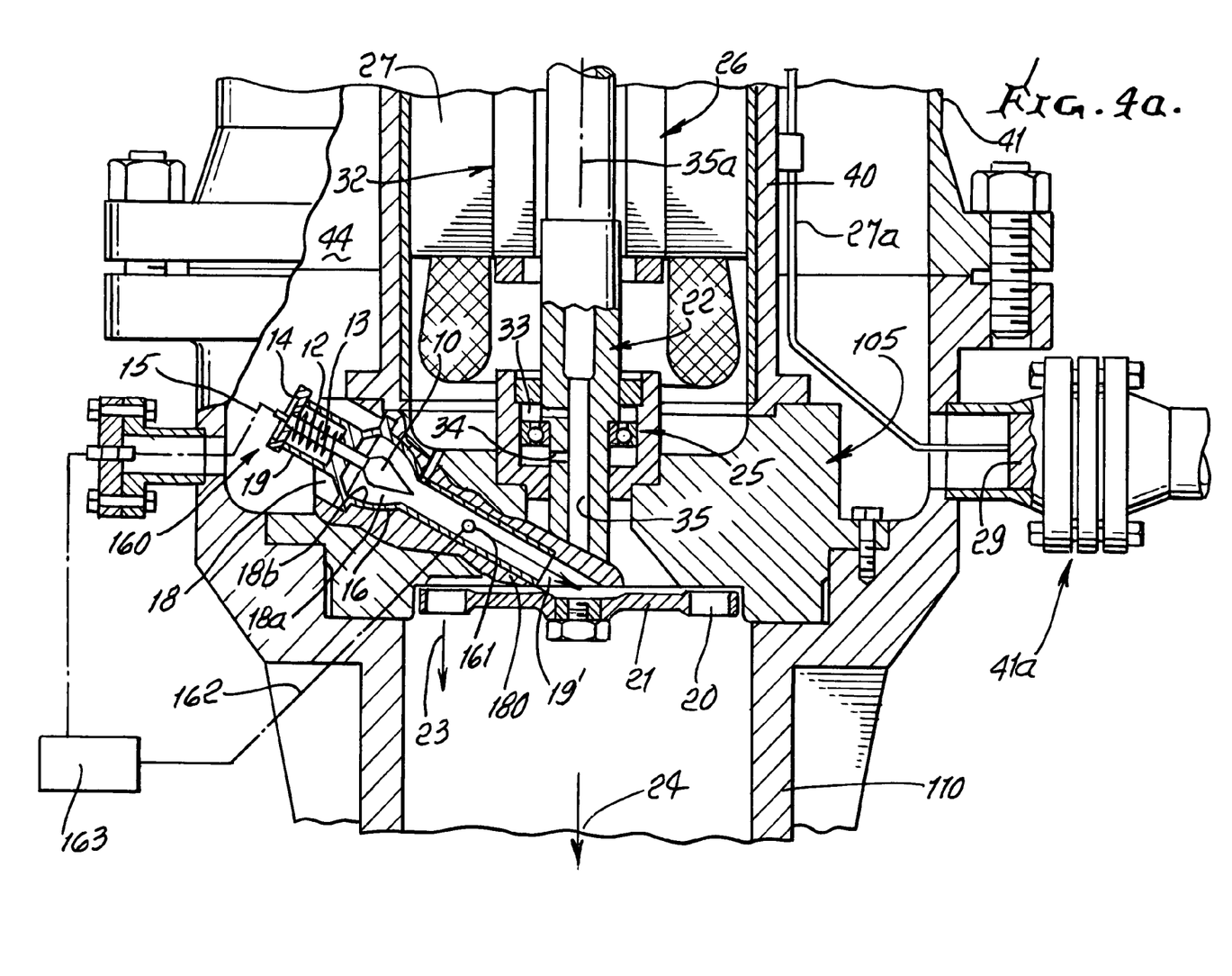
FIGS. 4a, 4b and 4c are enlargements.
Figure 4B:
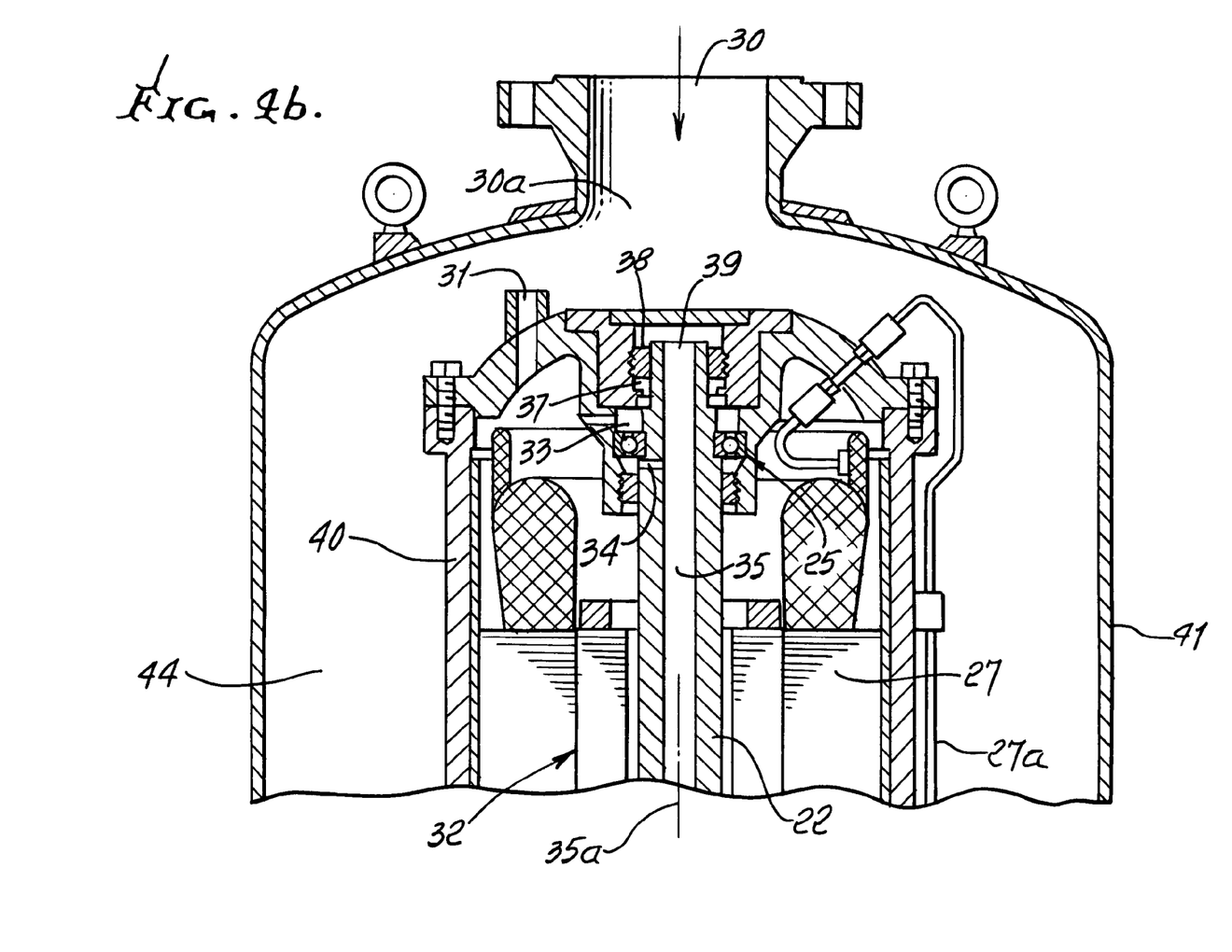
Figure 4C:
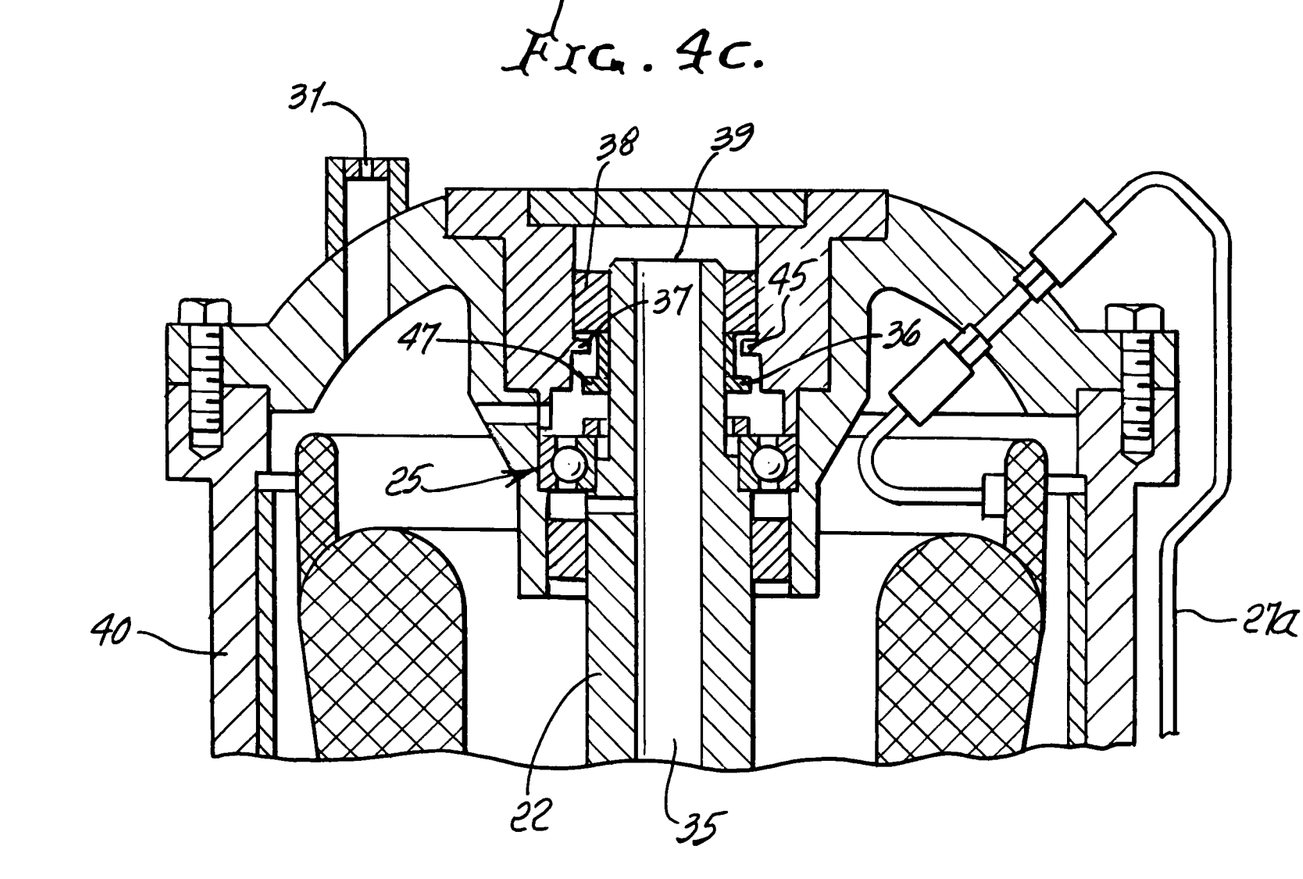
Figure 5:
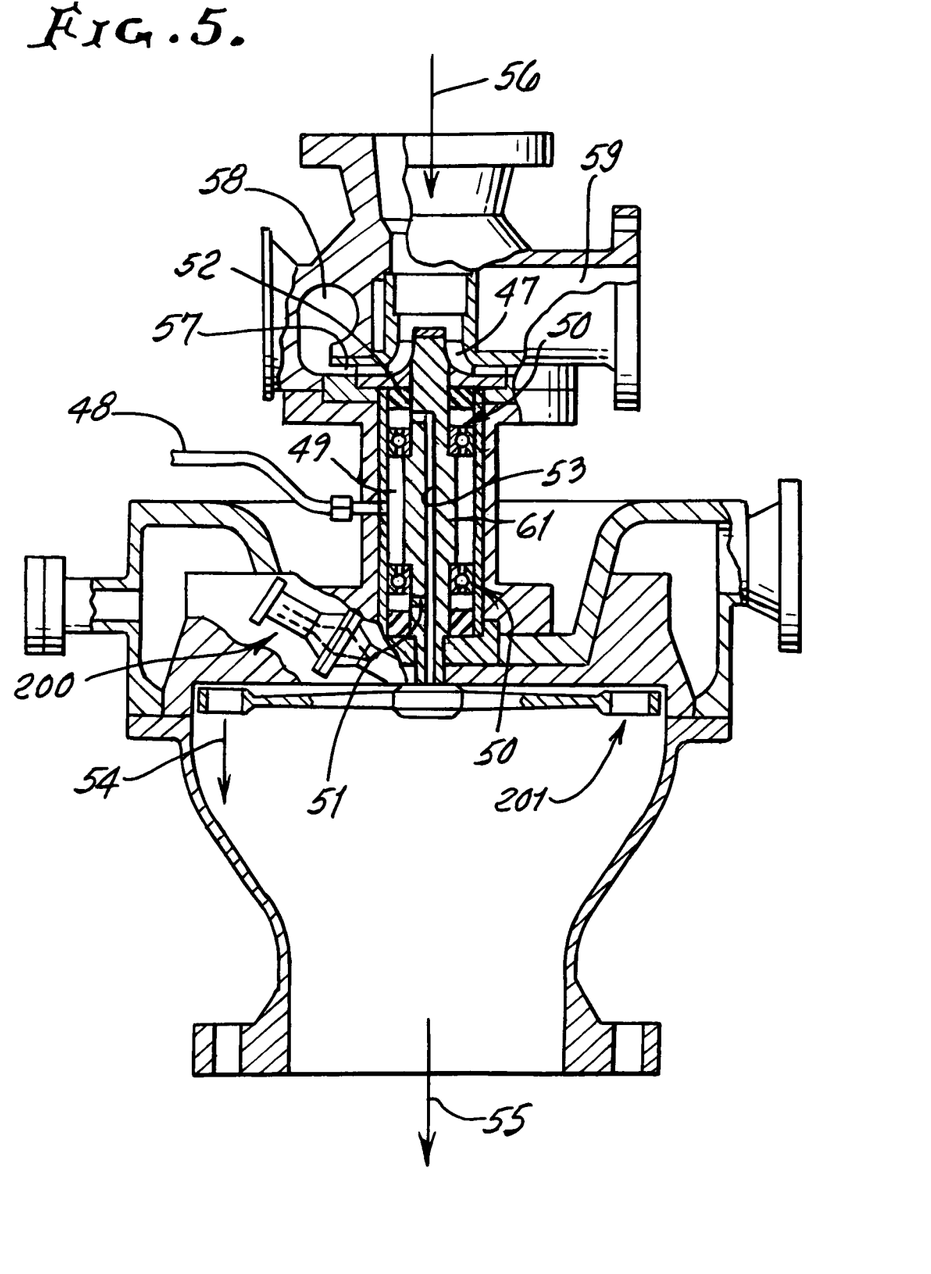
FIG. 5 is a section taken through turbine apparatus, showing another application.

FIG. 3 illustrates an application of the design method to the two-phase nozzle of FIG. 1. As shown, the droplet size is increased from 3 microns to 4 microns. The resulting slip is correspondingly increased in the high velocity downstream regions of the nozzle resulting in an increase in the averaged exit velocity, 10a, from 719 feet per second for the nozzle configuration of FIG. 1 to 730 ft/s for the optimized nozzle. This surprising result stems from reduced friction losses as well as reduced droplet breakup energy required. Because the difference in droplet size is small, the increased velocity is more important. Variations in flow to the nozzle can be controlled with a throttling valve. However, reducing the flow using a valve causes a loss in efficiency. To enable efficient operation at part flow, an adjustable center body with a special contour, "the pintle", is used, and shaped with taper, as shown.

FIG. 4*a* shows the use and operation of such a pintle 10, having a smoothly decreasing cross sectional area in the axial direction toward its pointed tip. As the pintle is translated in the direction of the throat, 16, a gradual decrease in flow area from the nozzle inlet, 18, to the throat 18*a* results. This action enables lower flow rates to efficiently accelerate to the same velocity at the throat at the design flow rate with the full throat area available. The pintle has a radially outwardly facing concave side wall that faces toward receptacle wall 18*b* that tapers toward throat 16.

As also seen in FIG. 4*a*, pintle is attached to a sliding rod, 13, which in turn is attached to actuator piston, 14, which has a sliding seal with the housing, 19. In the variation shown, a spring, 12, is compressed by the action of a high pressure fluid, 15, admitted to the face of the piston. The force from the piston causes the pintle to have a closing or area reduction action. In this version, the throat area is normally open. The piston and high pressure fluid can be provided on the reverse side of the spring to produce a normally closed throat area. The arrangement depends upon process requirements.

Expansion of the flow to the proper pressure in the throat results in an efficient acceleration of the flow to that point. Expansion of the flow from the throat to the nozzle causes some over-expansion losses, which have been found to be minimized when two fluid phases are present. Expansion in the nozzle of a mixture of a gas and liquid phase; or of a supercritical phase; or of a pure gaseous phase; or of a liquid phase that transitions to a mixture of gas and liquid; or a liquid phase that transitions to a mixture of gas and liquid and then subsequently transitions to a pure gaseous phase produces a well collimated nozzle exit stream at 19', of liquid and gas or dry gas having kinetic energy.

The nozzle exit stream is subsequently directed onto rotating blades, 20, attached to a blade carrying rotor, 21, which is in turn attached to axially extending tubular shaft, 22, supported by bearings, 25. The kinetic energy of the nozzle exit stream is transferred to the blades producing a torque on the rotor and shaft. The design of the blade profile depends upon whether the nozzle exit stream is a liquid and gas mixture, or a dry gas. If the nozzle exit stream is a liquid and gas mixture, the design of the blade profile further depends upon the droplet size.

The flow 23 leaving the blades passes to the outlet, 24. If the flow leaving the blades is a liquid and gas mixture, sufficient kinetic energy can be left to produce swirl causing separation of the liquid from the gas with an internal separator.

The variable phase turbine generator apparatus version shown in FIG. 4 is configured for use with an electrically non-conducting fluid, such as liquefied natural gas or liquid ethylene or a refrigerant. The shaft is attached to a generator rotor, 26, the rotation of which causes generation of electric power in a stator, 27. See FIG. 4*b* and 4. Power is removed by a conductor 27*a* and transmitted at 41*a* through the casing, 41, using an insulating feedthrough means 29. Nozzle 180 extends at one end of the generator, and terminates at exit 19' offset from the rotor axis 35*a*, adjacent the circular path of rotation of the blades. Annular body 105 supports the casing 41 as well as the angularly directed nozzle.

The fluid is supplied to the VPT through an inlet port, 30. The fluid is directed through an annulus, 44, to the nozzle inlets, 18, exposed to 44. A highly compact and efficient design is thereby achieved.

A portion of the fluid flow is diverted through a port, 31, in an inner casing, 40 near entrance 30*a* to outer casing 41. Casing 40 supports the generator casing 41 and bearings. A portion of the diverted fluid flows to the bearing cavities, 33, and subsequently through the bearings, to provide lubrication and heat removal. The fluid leaving the bearings is discharged through orifices, 34, which communicate with passage, 35, within the shaft. That passage endwise communicates with the pressure of the fluid leaving the turbine, 23, which is lower than the pressure of the fluid entering the nozzles 18, and that diverted, 31. The passage 35 within the shaft communicates with the upper end of the shaft, 39, opposite the turbine rotor, resulting in a low pressure at the shaft end. Nozzles 18 are spaced annularly about the shaft axis 35*a*.

Another portion of the diverted fluid flows through the gap 32 between the generator rotor and the stator, removing heat generated by electrical and frictional losses. This portion of the fluid flows through the bottom bearing, providing lubrication and heat removal before flowing at 34 into the low pressure passage 35 within the shaft.

The weight of the shaft and rotor and the frictional forces due to the fluid flowing downwardly in the gap would produce a downward or axial force on the bearings. FIG. 5 shows the method of force alleviation, with another portion of the diverted fluid flowing through the gap, 47, formed by a throttling disc 36 attached to the shaft and a stationary member, 45, attached to the inner casing. The downward force has a tendency to move the shaft in the downward direction opening the gap 47, causing the loss of throttling and a high pressure in the cavity, 37, below the face of another disc, 38, attached to the shaft. The high pressure and force on the upper disc causes the shaft to move upward and the gap to close, resulting in a throttling action, reducing the pressure and force on the face of the upper disc until the upward force just balances the downward force. At this point there is no net axial force on the bearings and the balance is automatically maintained.

Shroud 110 below blades 20 and body 105 prevents discharged liquid from contacting casing 41 and from redirection to contact the moving blades causing losses in torque.

Another application is to use the variable phase turbine to drive a compressor. FIG. 5 shows a single stage centrifugal chiller driven by the shaft, 61, from the VPT, which has no external seals. Flow, 56, enters the compressor and is increased in pressure by the moving vanes, 47. A further increase in pressure occurs in the diffuser, 57. The flow is then collected in the volute, 58, and leaves through a port 59. The fluid compressed can be the same as, or different from, the fluid operating the Variable Phase Turbine.

A portion of the fluid operating the variable phase turbine, is admitted through a pipe, 48, to a cavity, 49. The fluid flows through the bearings, 50, to lubricate them, and into passages, 51, in the shaft, 61. The fluid then flows through a central passage, 53, in the shaft and mixes with the flow, 54, leaving the moving blades. The mixed flow, 55, leaves the structure through a port. The VPT nozzle structure, 200, and blading 201, is generally the same as in FIGS. 1-4.

Seals, 52, are provided to prevent the fluid operating the variable Phase Turbine, from mixing with the compressor fluid.

Figure 6:
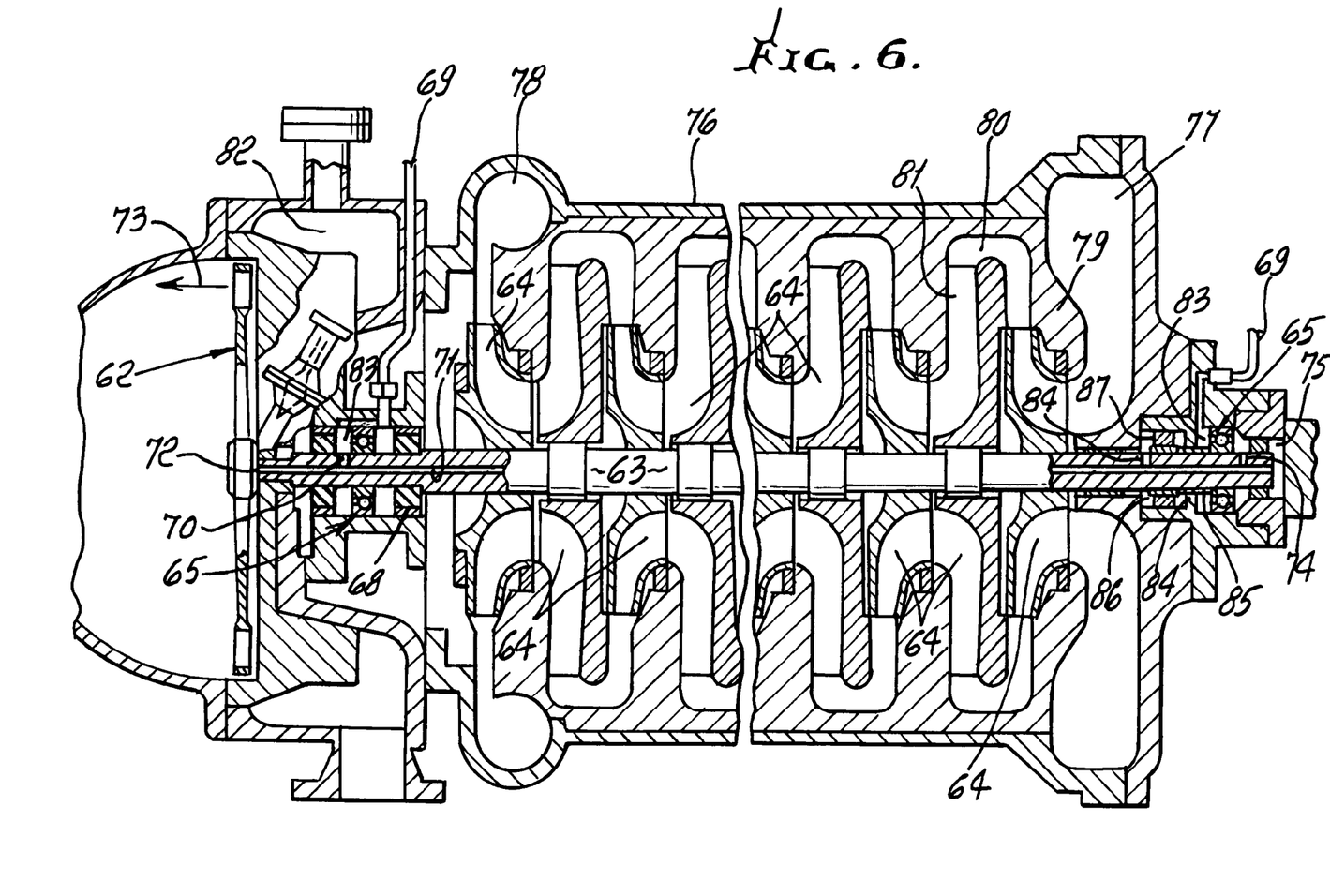
FIG. 6 is a section through a variable phase turbine compressor.

A combined variable phase turbine and multistage compressor is shown in FIG. 6. The VPT bladed rotor, 62, transfers torque to a shaft, 63, causing compressor rotors, 64, attached to the shaft to rotate. The shaft is supported on bearings, 65.

The vapor to be compressed enters the compressor casing, 76, through a port, 77. The vapor is compressed by the first rotor 64 and discharged into a stationary diffuser, 79, where the pressure of the vapor is increased further. The vapor then flows into a cross-over channel, 80, and is ducted inwardly at 81, to the inlet of the next rotor 64. The process continues to the last rotor where, after the vapor is discharged into the last diffuser and the pressure increased, the vapor leaves the casing through a port, 78, and flows to the process.

A portion, 69, of the liquid, 82, driving the VPT is diverted to chambers, 83, in proximity to the bearings. The liquid flows through the bearings to provide lubrication and cooling. Seals, 68, are provided to isolate the liquid from the vapor being compressed. The liquid used for bearing lubrication discharges through a passage or passages 70, into a passage, 71, in the shaft and subsequently is endwise discharged at 72, into the exhaust region of the VPT rotor, and mixes with the flow leaving the blades, 73.

The pressure difference across the compressor rotors typically produces an axial force on the bearings. To counteract this force, another portion, 83, of the diverted fluid flows through the gap, 74, formed by a throttling disc, 84, attached to the shaft and a stationary member, 85, attached to the casing. The axial force from the pressure difference has a tendency to move the shaft, opening the gap, causing loss of throttling and a high pressure in the cavity 86, below the face of another disc, 87, attached to the shaft. The high pressure and force on the upper disc causes the shaft to move opposite to the pressure difference and the gap to close, resulting in a throttling action, reducing the pressure and force on the face of the second disc until the force on the disc just balances the pressure force. At this point there is no net axial force on the bearings and the balance is automatically maintained.

The liquid flowing through the disc enters a chamber 75, and is discharged through the central passage, 71, in the shaft to the exit of the VPT rotor.

Figure 7:
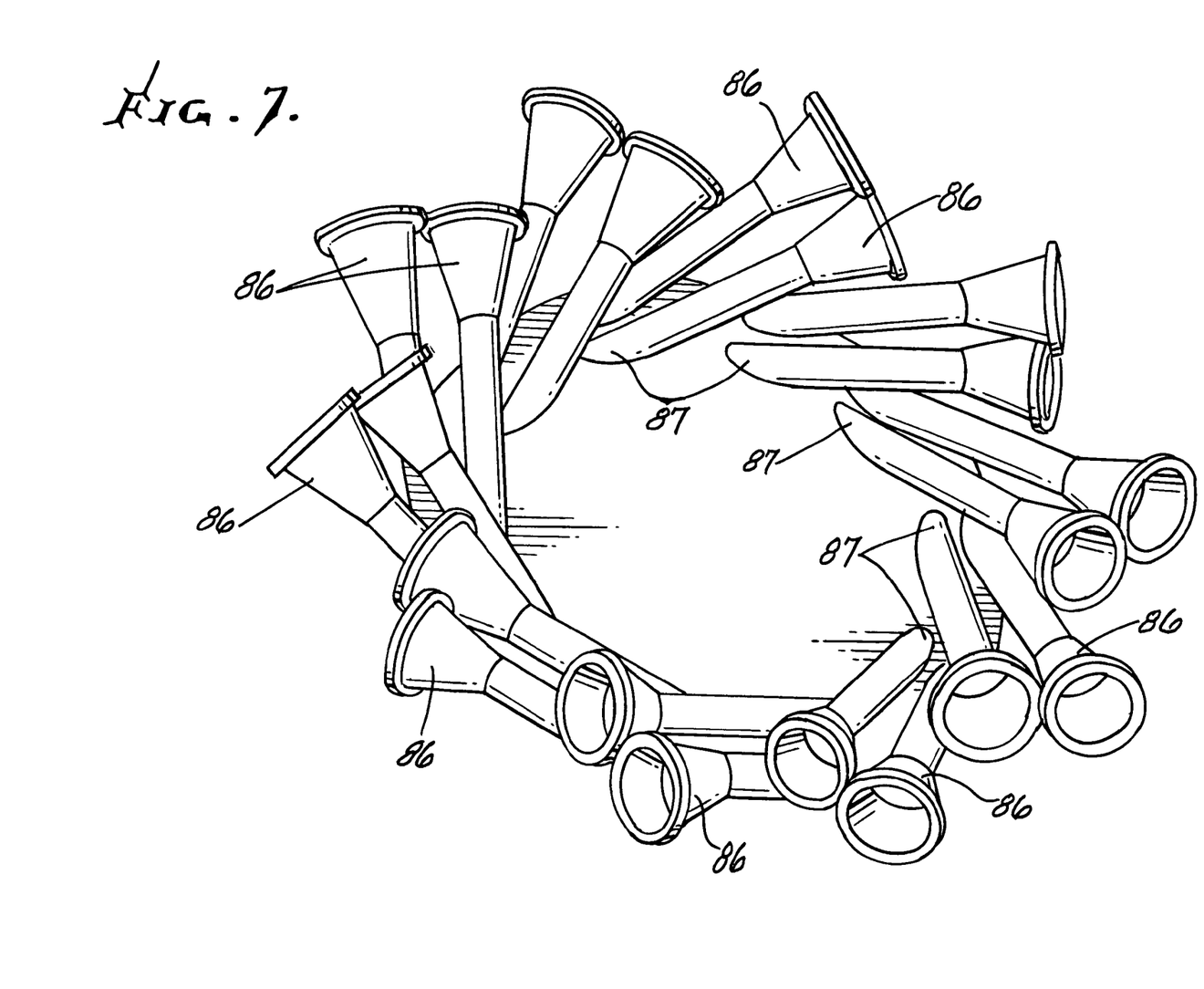
FIGS. 7 and 8 are views that show dual nozzle rows, as may be employed in the FIG. 4 apparatus.

For a given rotor speed and nozzle exit velocity there is a limit to the flowrate that can be provided to the turbine by a single row of axisymmetric nozzles. That limit is:

$$\text{maximum flow rate} = \frac{\pi(\rho V)_b N V^2 \left(\frac{U}{C}\right)^2}{4\omega^2} \sin^2(2\alpha)\tan^2\left(\frac{\pi}{N}\right)$$

where
$(V)_b$=bulk averaged mass flux
N=number of nozzles
V=Velocity leaving nozzles
(U/C)=Tip/Jet velocity ratio
$\omega$=angular frequency
$\alpha$=nozzle angle To provide more flowrate at the optimum subtended angles while keeping the rotor speed constant, a second row of axisymmetric nozzles, radially inboard of the first row can be used. FIG. 7 shows the arrangement of an outer row of nozzles, 86, and an inner row, 87, while maintaining the angle between the nozzle centerline and the plane normal to the centerline of the rotor.

Figure 8:
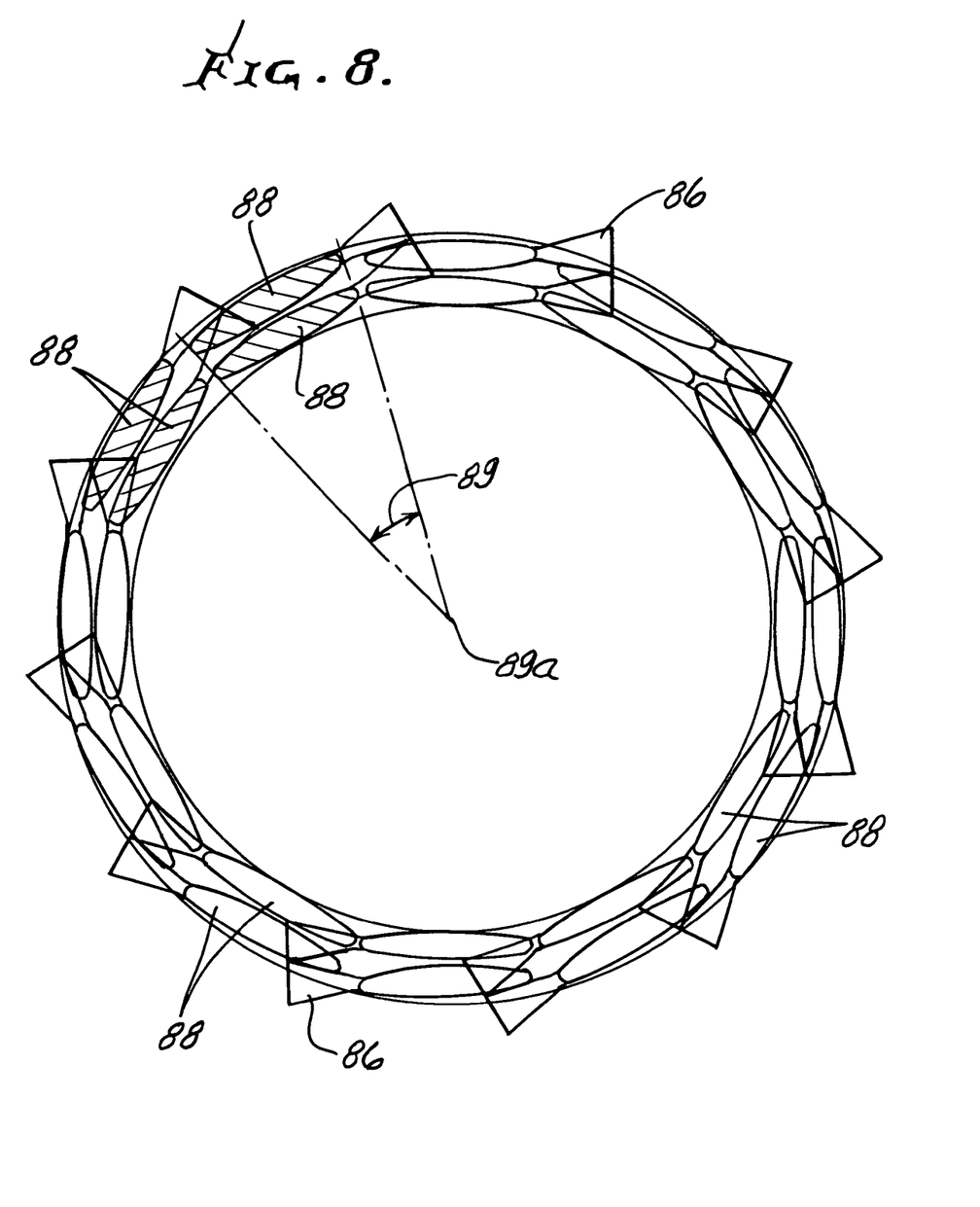

FIG. 8 shows that the areas 88, normal to the plane perpendicular to the centerline of the turbine rotor, and the subtended angle 89, from axis 89a are closely similar for the nozzle first row and second row. The similarity enables efficient conversion of the kinetic energy from both rows of nozzles by the blades of the VPT. Each area 88 corresponds to a cross section, at a nozzle.

Figure 9:
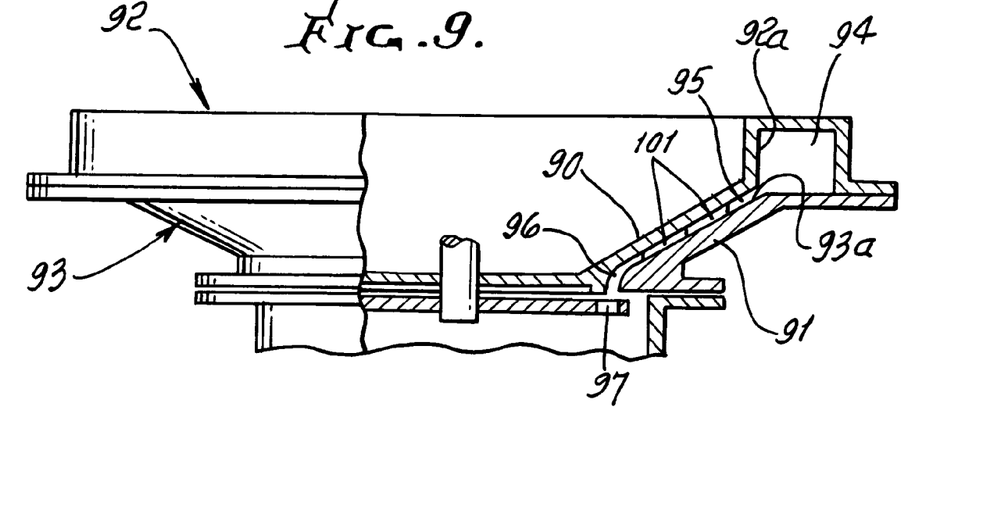
FIG. 9 is a section showing full admission nozzle.
Figure 10:
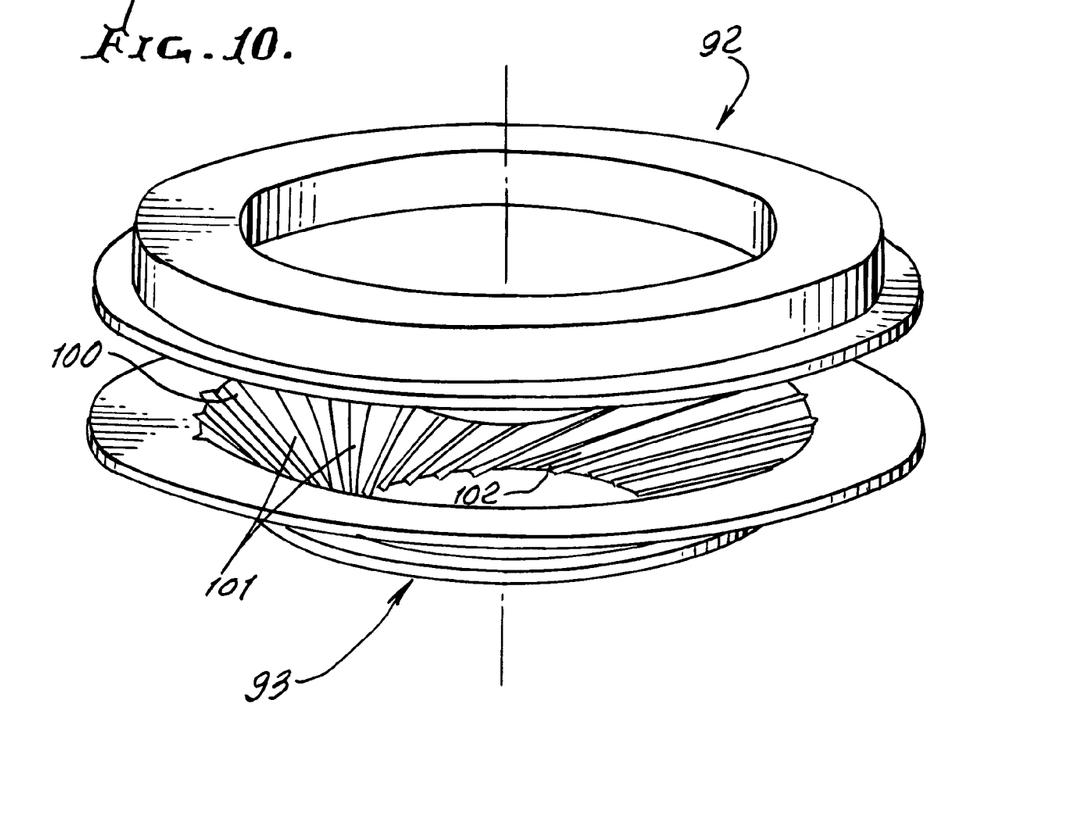
FIG. 10 is a perspective view showing vanes of full admission nozzles.

Another method to provide more flow at the optimum subtended angles is to provide a nozzle formed by two contoured surfaces with dividing vanes inserted between the surfaces to guide the expanding flow at the proper angle. FIG. 9 shows cross sections 90 and 91, of the two contoured annuli 92 and 93 that incorporate such surfaces guiding vanes 101 extend between such surfaces 92a and 93a. Generally high pressure flow is provided from a plenum, 94, formed by assembly of mating parts, and enters the nozzle passage, 95, at a generally inclined angle to the plane of the passage, typically 15-20 degrees. The flow expands to the exit, 96, where it leaves the nozzle at the same inclination and impinges on turbine blades, 97. FIG. 10 shows the annuli 92 and 93 having the nozzle surfaces. One of the surfaces, 100, is shown for the lower 93. The guiding vanes, 101, are shown to make an angle, 102, with the plane perpendicular to the axis of the nozzle structure. This angle is typically between 15-20 degrees.

In the above, the medium is one of the following:
$x_1$) 1,1,12-Tetrafluoroethane, i.e., R134a
$x_2$) ii Difluoro-1,1-ethane, i.e., R152a
$x_3$) 1,1,1,2,3,3,3-heptafluoropropane, i.e., R227ea
$x_4$) 1,1,1,2,3,3-hexafluoropropane, i.e., R236ea
$x_5$) 1,1,1,3,3-pentafluoropropane, i.e., R245fa
$x_6$) 1,1,2,2,3-pentafluoropropane, i.e., R245ca
$x_7$) 1,1-dichloro-2,2,2-trifluoroethane, i.e., R123
$x_8$) CO2
$x_9$) CH4
$x_{10}$) propane
$x_{11}$) ethylene
$x_{12}$) propelene
$x_{13}$) water
$x_{14}$) nitrogen
$x_{15}$) mixtures where the above fluids comprise 50% or more of the mixture, Also disclosed herein are the contents of all claims.

We claim:

1. A variable phase turbine comprising:
   i) nozzle structure operable to discharge a fluid medium of liquid, supercritical fluid or a mixture of liquid and gas with conversion of medium enthalpy to kinetic energy in a directed stream of a mixture of gas and liquid, supercritical fluid or pure gas, said directed stream characterized by the chemical composition of the fluid medium and the thermodynamic conditions of the enthalpy conversion process, said nozzle structure directing the flow at blade structure for displacing said blade structure,
   ii) the blade structure configured to maximize the conversion of the kinetic energy of said directed stream into torque acting upon rotor structure carrying said blade structure,
   iii) said rotor structure to which blades defined by the blade structure are attached transmitting torque to a shaft to which the rotor structure and a load are attached,
   iv) casing structure configured to confine and direct the medium and which contains bearings and seals to enable the shaft to transmit the torque, and v) shroud structure configured and located to prevent liquid which has transferred kinetic energy to the blades from contacting the casing structure and from being re-directed to contact the moving blades, causing losses in torque and, vi) there being a pintle associated with the nozzle structure and operable to be moved axially in an axial flow zone of the nozzle structure to control flow particle size, and there being other means for sensing flow particle size downstream of the pintle and operatively connected with the pintle for controlling said pintle axial movement, whereby flow particle size discharged from the nozzle structure is substantially minimized, vii) said pintle being forwardly and axially tapered in a narrowed flow zone defined by the nozzle structure, viii) said turbine having blades having an angular displacement of each blade leading edge from the perpendicular to the axis of the nozzle structure of between 1 degree to 15 degrees counter to the rotational direction, ix) the nozzle structure having flow through configurations, that are functions of input fluid phase compositions to minimize fluid particle size while optimizing kinetic energy of nozzle discharge incident on turbine blades, x) the pintle position controlling slip at inlet regions of the nozzle structure, and xi) an actuator to control pintle positioning, and actuator control means to maximize said slip, for a selected fluid phase flow.

2. The turbine of claim 1 characterized and configured with optimization in conformance with a computer program characterizing the nozzle pressure profile to produce the maximum conversion by the nozzle structure of enthalpy for a medium of liquid or supercritical fluid to kinetic energy in a directed stream of a mixture of gas and liquid, supercritical fluid or pure gas.

3. The turbine of claim 1 characterized and configured with optimization in conformance with a computer program characterizing the nozzle structure pressure profile to produce minimum liquid droplet size in the nozzle structure while optimizing kinetic energy for a mixture of gas and liquid.

4. The turbine of claim 1 having a discontinuity in the profile of the wall of the nozzle structure, said discontinuity causing any liquid on the wall to be directed into the flowing stream.

5. The turbine of claim 1 having two or more said nozzle structures with centerlines at different radii.

6. The turbine of claim 1 with nozzle structure having plate dividers separated by contoured surfaces enabling linear streamlines and full circumferential admission.

7. The turbine of claim 1 characterized and configured with optimization in conformance with a computer program characterized in that the blade structure produces the maximum conversion of the kinetic energy to torque by a directed stream of a mixture of gas and liquid, supercritical fluid or pure gas.

8. The turbine of claim 1 wherein for a directed stream of a mixture of liquid and gas, the blade structure has an initial section with a gradual angle optimized to minimize the sum of momentum losses and friction losses when the stream impacts the blade structure surface.

9. The turbine of claim 1 wherein for a directed stream of a mixture of liquid and gas, the blade structure is configured to increase the hydraulic diameter of liquid flowing on the blade structure surface, thereby reducing friction losses.

10. The turbine of claim 1 wherein for a directed stream of a mixture of gas and liquid, the blade structure is configured to configure a trajectory of liquid leaving the surface of the blade structure thereby to produce a tangential component of the velocity relative to the shaft centerline, causing the liquid to be separated from the gas phase and to enter a passage provided in the casing structure to capture the liquid.

11. The turbine of claim 1 wherein for a directed stream of a mixture of gas and liquid, body structure is provided downstream of the rotor structure to prevent recirculation of the flow, preventing liquid from striking the blades defined by the blade structure.

12. The turbine of claim 1 in combination with a) a shaft connected to the turbine rotor, b) a shaft seal, and c) a generator connected to the shaft having bearings to support the shaft.

13. The turbine of claim 1 in combination with a) a shaft connected to the turbine rotor, b) a generator connected to the shaft that is cooled by the medium, and c) bearings supporting the shaft that are lubricated by the medium.

14. The turbine of claim 1 in combination with a) a shaft connected to the turbine rotor, b) a generator connected to the shaft that is cooled by the medium, c) bearings supporting the shaft that are lubricated by the medium, and d) a self adjusting balance mechanism to reduce and control the axial force resulting from pressure differences across the rotor and the weight of the generator rotor and shaft.

15. The turbine of claim 1 in combination with a) a shaft connected to the turbine rotor, b) bearings supporting the shaft, c) a compressor(s) connected to the shaft.

16. The turbine of claim 1 in combination with a) a shaft connected to the turbine rotor, b) bearings supporting the shaft, and c) a pump(s) connected to the shaft.

17. The combination of claim 1 and a) a vertical shaft, b) an annular plenum that supplies the medium to the nozzle structure, c) a passage for flow of the medium surrounding a generator, d) a port and insulated means to feed electrical wires from the generator through the wall surrounding the generator, e) the casing separated into components to enable access to the assembly comprised of the turbine, shaft and generator, and related parts.

18. The turbine of claim 1 where the medium is one of the following $x_1$) 1,1,12-Tetrafluoroethane, i.e., R134a $x_2$) ii Difluoro-1,1-ethane, i.e., R152a $x_3$) 1,1,1,2,3,3,3-heptafluoropropane, i.e., R227ea $x_4$) 1,1,1,2,3,3-hexafluoropropane, i.e., R236ea $x_5$) 1,1,1,3,3-pentafluoropropane, i.e., R245fa $x_6$) 1,1,2,2,3-pentafluoropropane, i.e., R245ca $x_7$) 1,1-dichloro-2,2,2-trifluoroethane, i.e., R123

$x_8$) CO2

$x_9$) CH4

$x_{10}$) propane $x_{11}$) ethylene $x_{12}$) propelene $x_{13}$) water $x_{14}$) nitrogen $x_{15}$) mixtures where the above fluids comprise 50% or more of the mixture.

19. Variable phase turbine of claim 1 defining, in combination
   a) a rotatably driven load structure, defining an axis,
   b) confinement structure forming a fluid flow passage extending generally axially and adjacent to said load structure,
   c) said turbine operatively connected to said load structure, to transmit rotary drive thereto,
   d) said nozzle structure receiving pressurized flow via said passage, and directing flow of fluid from said passage, expanded in the nozzle structure, at the turbine to rotate the turbine,
   e) the nozzle structure configured to expand flow consisting of two or more of the following phases:
      i) gas
      ii) liquid
      iii) gas and liquid mixture
      iv) supercritical gas and liquid mixture, and
   with efficient conversion of enthalpy.

20. The combination of claim 19 wherein said axis extends upright, and said nozzle structure and turbine are located below the load level, fluid flowing downwardly in said passage to said nozzle structure.

21. The combination of claim 20 including structure extending below said nozzle structure and turbine to direct discharged fluid downwardly away from said confinement structure, said load structure comprising an electrical generator having a rotor driven by said turbine.

22. The combination of claim 21 including surfaces located above said load structure and responsive to pressure of fluid flowing to said passage for exerting lifting force on the generator, during rotation of said rotor.

23. The combination of claim 19 wherein said pintle is controllably axially movable within a tapered nozzle bore, to selected position for controlling the particle size of fluid passing through the nozzle structure, and to control slip at inlet regions of the nozzle structure, said nozzle structure position adjusted to compensate for conversion of the flow from a first fluid phase to a second fluid phase, whereby sizes of flow particles leaving the nozzle structure are minimized in said first and second phases.

24. The combination of claim 23 wherein said nozzle structure includes multiple nozzles circularly spaced about said axis, and angled downwardly toward turbine blades, the nozzle structure having inlets below said passage.

25. The combination of claim 23 including computer programmed to control said actuator structure so as to maximize said slip, for a selected fluid phase flow.

26. The combination of claim 24 wherein said multiple nozzles are arranged in two concentric rings for enhancing nozzle fluid discharge drive moment exerted on turbine blading.

27. The combination of claim 26 wherein said two concentric rings are located below said load.

28. The combination of claim 19 wherein said nozzle structure is or are a two-phase nozzle, or nozzles.

29. The combination of claim 19 wherein the load is a compressor.

30. The method of operating the turbine apparatus of claim 1 which includes
   f) directing the flow through said nozzle structure,
   g) adjusting said nozzle structure to compensate for conversion of the flow from a first of said fluid phases to a second of said fluid phases, whereby sizes of flow particles leaving the nozzle structure are minimized in said first and second phases.

31. The method of claim 30 including controlling said adjusting by provision of and operation of a programmed computer.

32. The method of claim 31 wherein said controlling of said adjusting includes providing a tapered pintle or pintles in a tapered bore or bores of said nozzle structure, to extend lengthwise therein, and controllably and adjustably displacing said pintle or pintles lengthwise in said bore or bores to minimize said particle sizes.

33. The method of controlling the operation of the turbine of claim 1 with said nozzle to which pressurized fluid is supplied, that includes the step:
   adjusting nozzle flow through configuration, as a function of input fluid phase composition, by controlled axial movement of the pintle in the nozzle to minimize fluid particle size while optimizing kinetic energy of nozzle discharge incident on turbine blades, and collecting said flow at a location remote from an electrical generator driven by said turbine, and in downward extending away from the generator.

34. The turbine of claim 1 wherein the nozzle structure is characterized and configured by slip maximized at the inlet region or regions of the nozzle structure.

* * * * *